(12) United States Patent
O'Shea et al.

(10) Patent No.: US 11,284,277 B2
(45) Date of Patent: Mar. 22, 2022

(54) COMMUNICATIONS AND MEASUREMENT SYSTEMS FOR CHARACTERIZING RADIO PROPAGATION CHANNELS

(71) Applicant: DeepSig Inc., Arlington, VA (US)

(72) Inventors: Timothy J. O'Shea, Arlington, VA (US); Ben Hilburn, Reston, VA (US); Nathan West, Washington, DC (US); Tamoghna Roy, Arlington, VA (US)

(73) Assignee: DeepSig Inc., Arlington, VA (US)

( * ) Notice: Subject to any disclaimer, the term of this patent is extended or adjusted under 35 U.S.C. 154(b) by 117 days.

(21) Appl. No.: 16/676,600

(22) Filed: Nov. 7, 2019

(65) Prior Publication Data

US 2020/0145842 A1 May 7, 2020

Related U.S. Application Data

(60) Provisional application No. 62/756,681, filed on Nov. 7, 2018.

(51) Int. Cl.
*H04W 24/02* (2009.01)
*H04W 24/08* (2009.01)
*G06N 20/00* (2019.01)
*H04W 24/04* (2009.01)

(52) U.S. Cl.
CPC .......... *H04W 24/02* (2013.01); *H04W 24/08* (2013.01)

(58) Field of Classification Search
None
See application file for complete search history.

(56) References Cited

U.S. PATENT DOCUMENTS

| | | | |
|---|---|---|---|
| 10,396,919 B1* | 8/2019 | O'Shea | G06N 3/0454 |
| 2002/0054607 A1* | 5/2002 | Morelos-Zaragoza | H04L 1/0007 370/470 |
| 2003/0231709 A1* | 12/2003 | Pare, Jr. | H04L 23/02 375/233 |
| 2004/0085909 A1* | 5/2004 | Soliman | H04W 24/02 370/252 |
| 2005/0265321 A1* | 12/2005 | Rappaport | H04L 41/147 370/352 |
| 2009/0310588 A1* | 12/2009 | Padovani | H04B 7/264 370/342 |

(Continued)

*Primary Examiner* — Faruk Hamza
*Assistant Examiner* — Cassandra L Decker
(74) *Attorney, Agent, or Firm* — Fish & Richardson P.C.

(57) ABSTRACT

Methods, systems, and apparatus, including computer programs encoded on computer storage media for characterizing radio propagation channels. One method includes receiving, at a first modem, a first unit of communication over a radio frequency (RF) communication path from a second modem, wherein the first modem and the second modem process information for RF communications. The first modem identifies fields in the first unit of communication, the fields used to analyze the RF communication path. The first modem extracts data from the fields. The first modem accesses a channel model for approximating a channel representative of the RF communication path from the first modem to the second modem, wherein the channel model includes machine learning models. The first modem trains the channel model using the extracted data. The first modem applies the trained channel model to simulate a set of channel effects associated with the communication path.

21 Claims, 13 Drawing Sheets

(56) References Cited

U.S. PATENT DOCUMENTS

| | | | |
|---|---|---|---|
| 2014/0016688 A1* | 1/2014 | Venkataramani | H04L 27/01 |
| | | | 375/232 |
| 2014/0072020 A1* | 3/2014 | Murphy | H04L 27/2671 |
| | | | 375/224 |
| 2015/0070089 A1* | 3/2015 | Eliaz | H03F 1/3282 |
| | | | 330/149 |
| 2015/0092824 A1* | 4/2015 | Wicker, Jr | H04B 7/0417 |
| | | | 375/224 |
| 2015/0139002 A1* | 5/2015 | Lee | H04L 1/0027 |
| | | | 370/252 |
| 2016/0373196 A1* | 12/2016 | Stott | H04B 7/0452 |
| 2017/0374561 A1* | 12/2017 | Zhang | H04W 24/08 |
| 2019/0075569 A1* | 3/2019 | Zhang | H04B 7/0632 |
| 2019/0141580 A1* | 5/2019 | Oktay | H04W 72/08 |
| 2021/0091979 A1* | 3/2021 | Ye | H04L 25/03821 |

* cited by examiner

COMMUNICATIONS AND MEASUREMENT SYSTEMS FOR CHARACTERIZING RADIO PROPAGATION CHANNELS

CROSS-REFERENCE TO RELATED APPLICATION

This application claims the benefit of U.S. Provisional Application No. 62/756,681, filed on Nov. 7, 2018, which is incorporated herein by reference.

TECHNICAL FIELD

This disclosure is directed towards communications and measurement systems for characterizing radio propagation channels, including, for example, radio systems for channel sounding, channel approximation, encoder/decoder learning and inference, model storage and online updating and recall of models.

BACKGROUND

Radio frequency (RF) waveforms are prevalent in many systems for communications, sensing, measurements, and monitoring. RF waveforms are transmitted and received through various types of communication media, such as over the air, under water, or through outer space. In some scenarios, RF waveforms are used to transmit information that is modulated onto one or more carrier waveforms operating at RF frequencies. In other scenarios, RF waveforms are themselves information, such as outputs of sensors or probes. Information that is carried in RF waveforms is typically processed, and/or transported through other forms of communication, such as through an internal system bus in a computer or through local or wide-area networks.

SUMMARY

A radio communications and measurement system described in this document is used to accomplish a number of tasks, which include one or more of learning stochastic models of a radio propagation channel, learning methods for communicating over that channel, replaying and simulating channel conditions, storing and loading communications models, learning and adapting synchronization and estimation signal processing routines to improve performance over one or more channels, and deploying these models. The radio communications and measurement system (also referred to simply as "radio system") includes a number of modes that may be used individually or collectively in order to accomplish these tasks. A radio propagation channel, in this context, refers to a wireless communication channel (but may also refer to other media such as optical or acoustic communications channels) that is used for transmission, reception, or both, of radio frequency signal waveforms that carry user information. Examples of radio propagation channels include $4^{th}$ Generation Long Term Evolution (4G LTE) cellular network channels, $5^{th}$ Generation (5G) cellular channels, and $6^{th}$ Generation (6G) cellular channels, point-to-point backhaul communications channels over terrestrial links, satellite communications links, mesh networks, point-to-multipoint, wireless local area network, etc.

These modes can include the following: (i) measurement of channel effects within one or more communications channel; (ii) estimation of a stochastic model for the one or more communications channel based on the measurements; (iii) simulation of the one or more communications channels based on stochastic models; (iv) optimization of encoder and decoder networks for synchronization based on these stochastic models transmission of a frame of information over the communications channel comprising one or more of reference signals, sounding signals, baseline encoding signals, and learned encoding signals. Additionally, the modes can include (v) detection and synchronization to the information in the information frame; (vi) recovery of information from components of the information frame; (vii) updating of synchronization routine approximations using received information; (viii) storing, loading, and/or inference of models for at least one of encoding, decoding, and synchronization. The modes can also include (xi) deployment of known test sequences over baseline encodings and/or learned encodings; (x) computation and comparison of performance metrics between baseline and learned encodings; (xi) display of received signal information within a user interface; (xii) display and/or comparison of performance metrics within a user interface, data packet encoding, error correction, packet interfaces and deployment over the air using software radio devices or embedded digital radio devices, as well as a cloud centric model management.

In one general aspect, a method includes: receiving, at a first modem, a first unit of communication over a radio frequency (RF) communication path from a second modem, wherein the first modem and the second modem process information for RF communications; identifying, by the first modem, one or more fields in the first unit of communication, the one or more fields used to analyze the RF communication path; extracting, by the first modem, data from the one or more fields; accessing, by the first modem, a channel model for approximating a channel representative of the RF communication path from the first modem to the second modem, wherein the channel model includes one or more machine learning models; training, by the first modem, the channel model using the extracted data, wherein the training includes: providing, by the first modem, the extracted data to the channel model, processing, using the channel model, the extracted data, and in response to processing the extracted data, updating one or more parameters of the channel model, wherein the updated parameters of the channel model cause updates to the approximation of the channel representative of the communication path; and in response to training the channel model, applying, by the first modem, the trained channel model to simulate a set of channel effects associated with the communication path.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

Implementations may include one or more of the following features. For example, in some implementations, the method includes the one or more fields of the first unit of communication include at least one of (i) a preamble frame, (ii), one or more reference signals, (iii) a sounding frame, (iv) a baseline encoding frame, or (v) a learned encoding frame.

In some implementations, the method further includes determining, by the first modem, a presence of an information frame by detecting a presence of the preamble frame in the first unit of communication; and detecting, by the first modem, one or more of: a time offset corresponding to an arrival time of the first unit of communication effected by the communication path, a frequency offset corresponding to the arrival time of the first unit of communication effected by the communication path, or a spatial offset unit of communication to the arrival time of the first unit of communication effected by the communication path.

In some implementations, the method further includes providing, by the first modem, one or more of the time offset, the frequency offset, phase offset, channel response, or the spatial offset to the channel model for approximating the channel representative of the communication path.

In some implementations, the method further includes determining, by the first modem, channel effects of the channel representative of the communication path by comparing data within the sounding frame of the received first unit of communication to known data transmitted in the sounding frame by the second modem; and providing, by the first modem, the set channel effects to the channel model for updating the approximation of the channel representative of the communication path.

In some implementations, the set of channel effects include one or more of amplitude response effects, phase response effects, memory effects, interference effects, distortion effects, compression effects, or noise effects, and one or more of these channel effects is applied to the channel model to train the channel model.

In some implementations, training the channel model further includes: providing, by the first modem, the extracted data from the one or more fields to the channel model for training the channel model to minimize a computational distance between characteristics exhibited by the channel model upon applying the set of channel effects to the channel model and characteristics of a reference channel used for comparison to the channel model.

In some implementations, the first modem is coupled to an electronic device having a display, wherein the electronic device is configured to display the first unit of communication, including one or more of: displaying a transmit signal constellation plot of the first unit of communication; displaying a received power spectral density of the first unit of communication; displaying partially synchronized information of the first unit of communication determined by the first modem; displaying data corresponding to the sounding frame; displaying data corresponding to the learned encoding frame; or displaying data corresponding to an error rate of the received first unit of communication at the first modem.

In some implementations, the method further includes generating, by the first modem, an encoder/decoder model used to model a use of encoding and decoding data between the first modem and the second modem, wherein the encoder/decoder model is configured to generate an encoding mode at a particular information rate for the second modem based on effects of the communication path.

The details of one or more implementations are set forth in the accompanying drawings and the description below. Other features will be apparent from the description and drawings, and from the claims.

DETAILED DESCRIPTION

Figure 1:
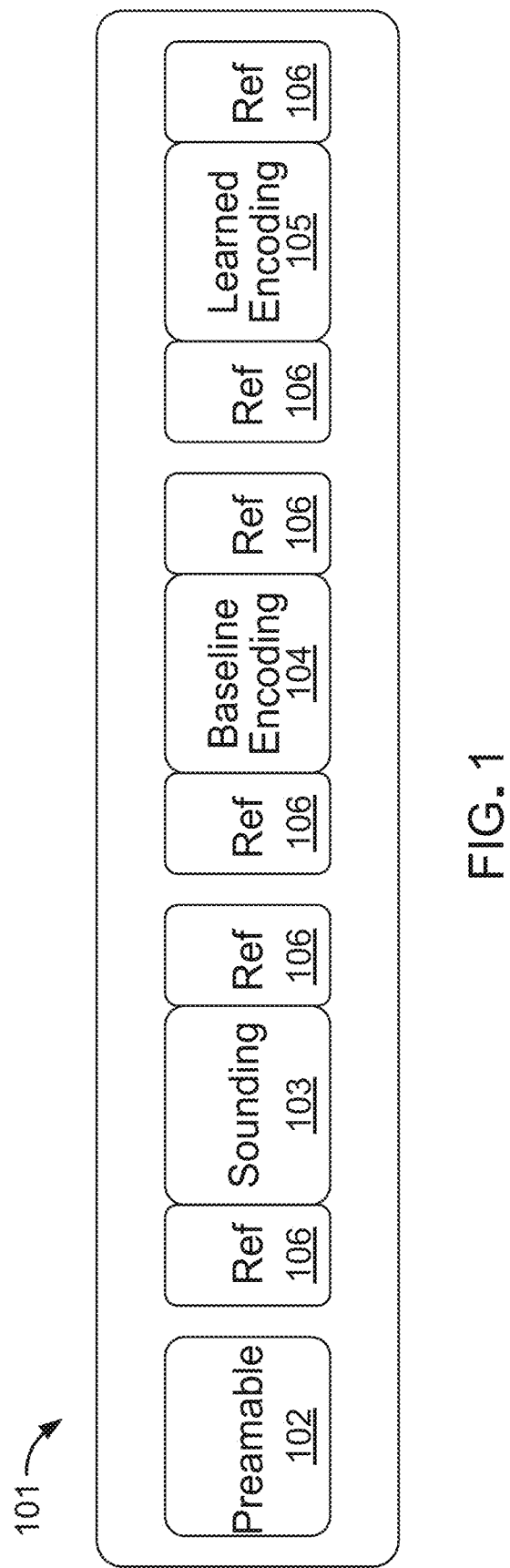
FIG. 1 is an example of an information frame transmitted by a transmit modem to one or more receive modems, and which includes various contents.

Traditionally, radio communications systems are designed such that they do not adapt their behavior dynamically for specific channel conditions of corresponding radio propagation channels. In some cases, in which adaptive coding and modulation (ACM) schemes are employed, these schemes choose a modulation and coding with an appropriate information rate for reliable communications over a given channel's signal to noise ratio (SNR).

Similarly, conventional tools used for measurement of channel conditions of radio propagation channels are usually limited to parameter estimation techniques. The parameter estimation techniques can include, for example, delay spread estimation, Doppler estimation, fading parameter estimation, and noise level estimation, to name a few examples. In some instances, the parameter estimation techniques can include generated parameters, which can be used within compact statistical models of a channel expressed from simple physical models. Additionally, such channel measurement tools have traditionally been used in an offline environment, such as within a research lab or within a product engineering office for a radio system, rather than on a particular device itself.

In some cases, ACM selection schemes can learn new modulation and coding schemes directly for a channel. An ACM selection scheme adapts to the effects imparted by a wireless channel, e.g., noise, to improve transmission and reception performance. The ACM selection scheme can also adapt between models for many more effects other than SNR. For example, the ACM selection scheme can adapt for effects that include fading conditions, interference types, impairment types, and traffic types to name a few examples. However, the ACM selection scheme cannot dynamically learn the channel, and use the data from the channel to train one or more stochastic models to emulate the channel. By emulating the channel, a transmission system can be manipulated in an offline environment before implementing the transmission system over an actual radio propagation channel.

In some instances, communications and measurement systems described herein can measure channel behavior of a radio propagation channel based on the transmission of reference tones, sounding signals, and/or encoded information over the communications channel (e.g., a sounding process). One such system can then use this sounding information to train one or more unconstrained stochastic models to emulate the radio propagation channel with high resolution, which may leverage explicit physical models for the radio propagation channel. By doing so, the system may model different types of stochastic impairments rather than a traditional parametric channel model fit (as performed with the ACM selection scheme, e.g., using current existing quadrature amplitude modulation (QAM) and amplitude and phase shift keying (APSK) based constellation and code defined data rates), and the system may explicitly fit stochastic models for a wide range of operating conditions. In some instances, sounding data, as well as stochastic channel models, are stored or recalled. These systems may be used within system simulations as well as for optimizing processes and test processes for communications systems (e.g., methods used for transmitting and receiving information between transmit and receive modems). In some cases, such as when integrating with cellular communication standards, e.g., 4G or 5G+, and interoperability modes, e.g., interoperable cellular devices in communication with one another where certain aspects of modulation, coding and protocols are well defined by standards, certain fixed encoding/decoding modes or baseline modes may be used for initial communications, while upon successful communication, various forms of model and encoder/decoder updates or adaptation may proceed to refine the communications link for improved performance over one or more communications channel (e.g. by updating modulation and encoding schemes to better perform over the communications link).

In some implementations, a disclosed system learns methods for signal detection, synchronization, equalization, and recovery based on received information over a radio propagation channel. The system can use the received sounding information to leverage characteristics of channel effects, other algorithms for synchronization, detection, equalization, and recovery as guides, and other methods. The system can leverage this information in order to improve subsequent transmission performance, lower computational complexity, and fit these functions to specific effects within the communications channel. For example, based on the leveraged characteristics of the channel, the system can then employ detection, encoding, synchronization, and equalization techniques to counteract the effects of the channel in order to improve transmission performance. In another example, the computational complexity is reduced because the employed techniques enable a more efficient communication system that reduces data loss over the radio propagation channel, which ultimately, reduces the amount of processing required to recover loss data at the receive modem. Thus, by learning channel effects, sufficient techniques can be employed to counteract the lossy channel effects.

In some instances, learned models for channel effects, as well as for encoding and decoding of information, and detection, synchronization, equalization and recovery of information are stored and loaded. In particular, these learned models can be stored at transmitting radios (modems) or receiving radios (modems), or both. These learned models can be used in channel effect simulations, and may be shared through a model management service in a database. The model management service may help aggregate, standardize, curate, combine, refine, consume, or provide models in order to help orchestrate or improve communication system performance over multiple locations, multiple times, multiple radios, or multiple communications channels, or any suitable of these.

While traditional communications systems may compute and display performance metrics, the systems described in this specification may transmit both traditional communications techniques and learned communications techniques over the same radio propagation channel. For example, one such system can transmit data over radio propagation channels, the data can include, for example, a time-interleaved, a frequency-interleaved, or otherwise a frequency modulated transmission. The system can perform these communication techniques while computing and displaying diagnostic information and performance metrics for both systems, e.g., transmit and receive systems to provide a direct display of advantages, disadvantages, and performance differences between the two or more systems or transmission approaches. The advantages and disadvantages can include simulations of metrics should different communication techniques be performed. In some instances, these transmission/encoding methods use the same information rate and/or block-size for transmission. In other instances, the information rates and/or block-sizes vary between the transmission and encoding modes.

FIG. 1 is an example of an information frame 101 transmitted by a transmit modem to one or more receive modems, and which includes various contents. In some instances, the information frame 101 represents one transmission of information that is self-contained. For example, all information corresponding to the communication is included in the information frame 101. However, in other implementations, the information frame 101 is part of a larger sequence of transmission that includes a plurality of information frames, where the transmission can occur regularly, at scheduled occurrences, or asynchronously over a channel. The information frame includes a preamble 102. The preamble 102 can be a known sequence or a set of possible sequences marking the beginning or a known point within the frame. Additionally, the information frame 101 includes one or more additional reference emissions 106), which occur within the frame to assist in frame detection, alignment, synchronization, equalization, sounding, recovery, or other signal processing functions. Additionally, the frame 101 includes dedicated regions in time, frequency, and/or space, which include signals adapted for sounding of a channel 103, for transmission of information using baseline encoding 104, and/or for transmission of information using learned encoding 105.

In some instances, baseline encodings include commonly used communications schemes such as QAM modulations, PSK modulations, QAM on OFDM modulations, FSK modulation's, or any other well-known modulation type. These baseline encodings may additionally include error correction, randomization, framing, error checksums or other conventional techniques for information transmission, encoding, or protection. In some instances, the learned encoding employs an encoding network, which learns to encode information over one or more communications channels. For example, the learned encoding can be used to employ an encoding network, such as, using an auto-encoder based communications system (or constrained form thereof entailing learning an encoder or decoder separately), or other method for optimizing an encoder networks, which includes one or more degrees of freedom in how information is converted into samples for transmission over one or more channels. In some instances, these learned encodings additionally employ error correction methods either learned or conventionally determined, along with error detection schemes and protocol framing structure.

Figure 2:
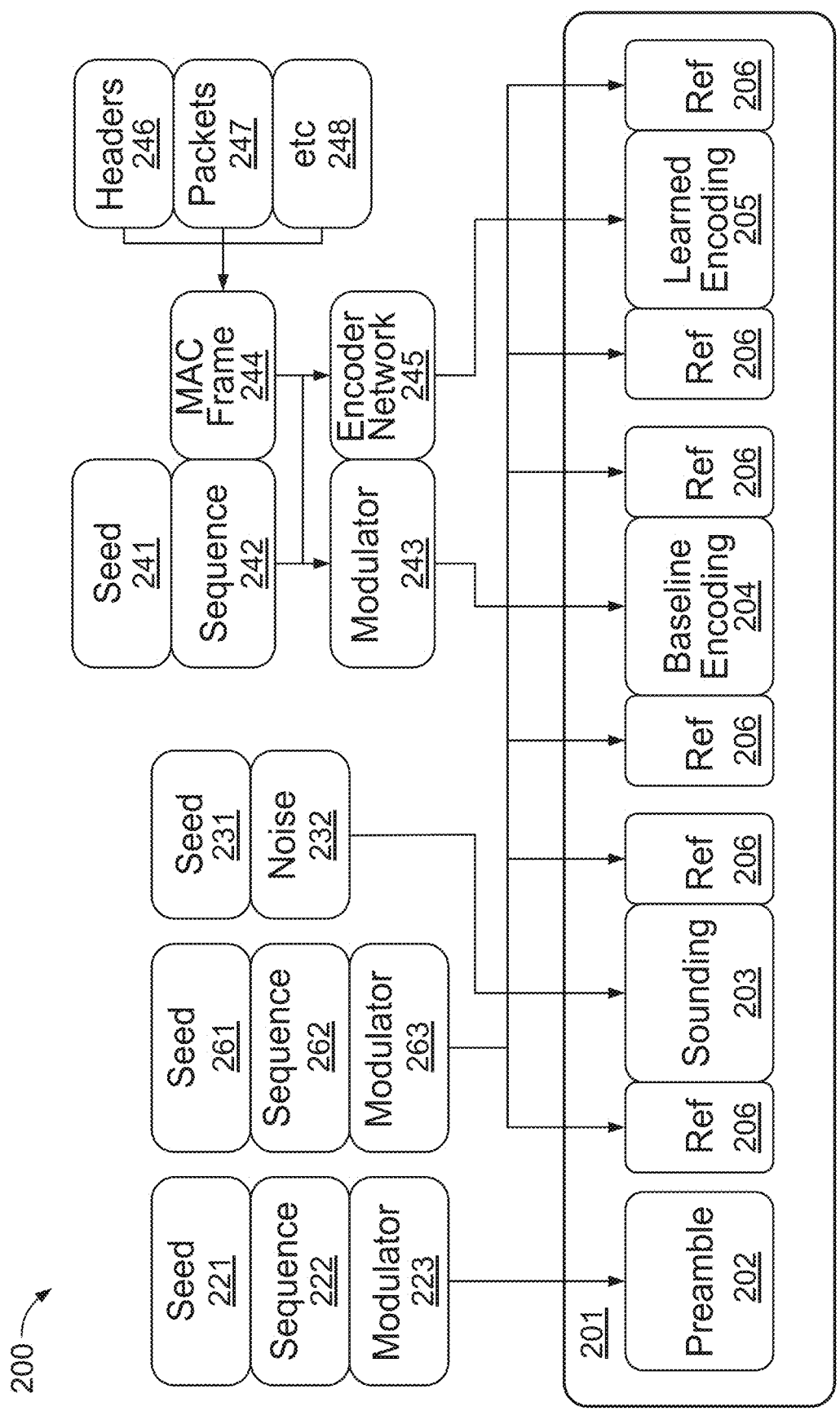
FIG. 2 is an example of an information frame generation process at a transmit modem that populates one or more sections of the frame with information.

FIG. 2 is an example of an information frame generation process 200 at a transmit modem that populates one or more sections of the frame with information. For example, the information frame 201 includes one or more preambles 202, one or more reference tones 206, one or more sounding signals 203, one or more baseline encoding sections 204, and/or one or more learned encoding sections 205. The one or more preambles 202 may be produced using any known sequence, or well-defined sequence generation routine, that may involve one or more seed values 221 that produce a known sequence 222. In some instances, this sequence may be accomplished, for example, with a linear feedback shift register, a cryptographic routine such as a stream cypher, a gold-code generation routine, a Zadoff-Chu sequence generation, or any other function that produces a sequence from one or more seeded values. The resulting sequence is then modulated by a modulator 223 to form samples for transmission of the preamble. For example, the resulting sequence can be modulated with BPSK, QPSK, a learned encoder, a spreading routine, and/or OFDM modulation, or a number of other modulation methods to form the preamble 202.

In some instances, a number of references 206 may also be placed throughout the information frame 101. The number of references 206 may be placed at known offsets, for example, which may use a similar routine with one or more seed values 261 producing one or more sequences of information 262 that may be modulated in a number of ways 263 to produce reference signals 206. The sounding signal 203 can be produced deterministically by the use of one or more seed values 231, which produce known information to transmit.

In one example, a seed value using a random number generator may be used to produce sequences of Gaussian random variables. The random number generator may produce known-random values for transmission within the sounding region of the information frame 101. However, the random number generator may also use the generation of sequences of information to be modulated in a number of ways.

Alternatively, the number of references information may not be deterministic. For example, a random BPSK sequence may be transmitted and the receive modem can make a best estimate to determine what information was transmitted and then assume the values which were transmitted. The receive modem performs a task, which could be assisted by error feedback or correction, to ensure correct transmit values are estimated in this case in which a known-deterministic sounding signal is not transmitted. In some instances, the seed values for any of these sections may remain constant from frame to frame. In some instances, the seed values may change between frames based on an algorithm or may change within a frame based on an algorithm, such as a seed scheduling process.

Additionally, each of the contents within the information frame 101, or various subsets within the information frame 101 may undergo additional permutations. The additional permutations can include, for example, randomization, spreading, permutation of time-slots, frequency slots, rotation, and/or other modulation parameters. The zero or more baseline encoding section 204 and zero or more learned encoding section 205 may transmit reference information. For example, the reference information can be derived from one or more seed values 241 by producing a known sequence 242, which may be modulated to produce the section. For example, the section may represent a series of symbols in either the baseline modulation, e.g., QAM, PSK, APSK, or in a learned modulation, where the values can be determined by a pre-determined series of bits, symbols, checksum, or by some form of redundancy or error checking. In the case of the baseline encoding section 204, a known modulation method 243, such as the method described for 223 can then be used to convert the sequence into modulated samples within the frame 101.

Likewise, an auto-encoder type configuration or other form of flexible learned encoding of information, e.g., for the learned encoding section 205 and encoder network 245, can be used to convert the sequence 242 into transmitted samples. Alternatively, for a known sequence 242, a MAC frame 244 can be transmitted in either of these sections by producing a sequence corresponding to a single MAC frame. The MAC frame may comprise header information 246 that may include control of reference information, information packets 247, which carry control or other data that can include Ethernet frames, IP packets, or other protocols carried over the link. The MAC frames may also carry additional information 248. For example, this additional information can include telemetry data, performance information, feedback or control information, or any other information used for transmission over the communication link.

Figure 3:
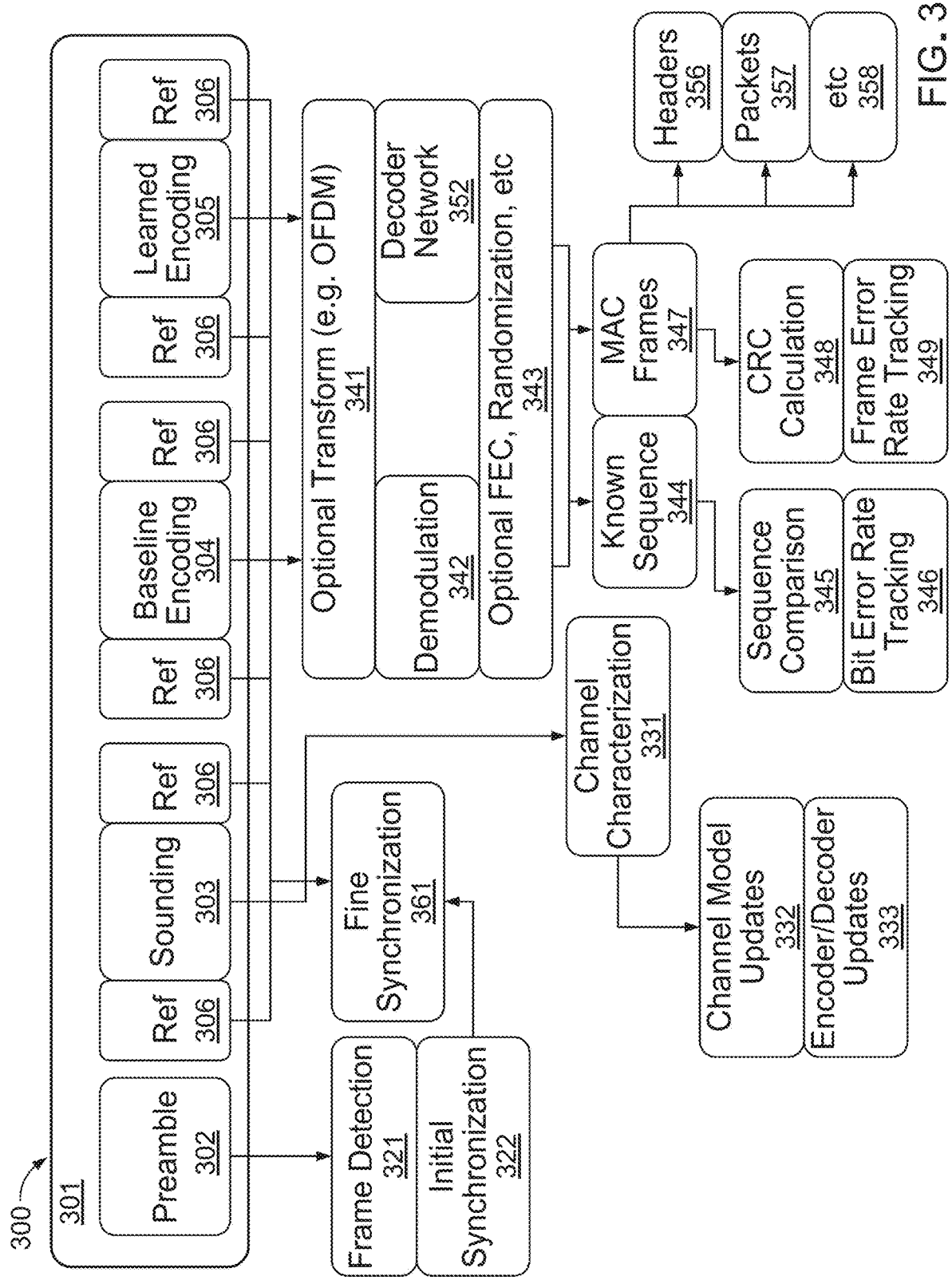
FIG. 3 is an example of the information frame detection, reception, recovery, and decoding process at the receive modem that leverages one or more transmitted sections within the information frame.

FIG. 3 is an example of the information frame detection, reception, recovery, and decoding process 300 at the receive modem that leverages one or more transmitted sections within the information frame. Here, a received information frame 301 may include one or more sections. The one or more sections may include a preamble 302, reference sections 306, sounding sections 303, baseline encoding sections 304, and learned encoding sections 305. An initial frame detection algorithm 321 performs the detection of the information frame using the preamble 302 or any other information within the information frame. In some instances, the initial frame detection algorithm 321 may be a matched filter or cross-ambiguity amplitude search for the preamble 302. In some instances, the initial frame detection algorithm 321 may represent a learned detection algorithm, such as a neural network, which can detect features indicating the presence of a frame.

In some instances, the initial frame detection algorithm 321 may include an algorithm that recognizes properties of the signal. For example, the type of algorithm that can recognize properties of the signal can include cyclo-stationary peaks or time/frequency correlations within the transmitted information frame for detection.

An initial synchronization algorithm 322 can then be employed to estimate a time offset related to the arrival time of the information frame 301. In some instances, the initial synchronization algorithm 322 can estimate a frequency or spatial mode offset of the arriving information frame 301, e.g. a center frequency and antenna beam pattern. In some instances, the initial synchronization process can include a set of estimators, such as a maximum a posterior (MAP), a minimum mean squared error (MMSE), or maximum likelihood (MLE) estimators, for a known preamble or modulation property. In some instances, the initial synchronization algorithm 322 can be a matched filter or cross-ambiguity function offset estimation in time, frequency, or spatial beam estimation routine.

In some instances, the initial synchronization algorithm 322 can be a learned synchronization routine. For example, the learned synchronization routine can be a neural network trained to produce time estimates, frequency estimates, or spatial estimates relating to the arriving information frame, preamble, or reference signals. In some instances, a secondary fine synchronization 361 step may be performed to refine time, frequency, phase, spatial, or fading estimates throughout the frame by using known reference signals 306. The secondary fine synchronization 361 may be processed by comparing reference signals to known values, using learned networks or methods to refine and correct unknown channel values from transmission, such as, phase, amplitude, frequency, or spatial combining, for example.

By refining these estimates, sections such as 303, 304, and 305, may be corrected to remove unknown channel state effects, such as fading, frequency offset, phase offset, and timing offset, through resampling, rotation, combining, or other correction algorithms. In some instances, the sounding section 303 can serve to measure the channel effects on the transmitted signal by comparing the received sounding signals 303 to those signals 203 that were transmitted. Those transmitted signals 203 may be transmitted, or generated separately on the receiver, by knowing the same seed, sequence, and modulator. By comparing these two signals, e.g., sounding signals 203 and 303, the channel effects, such as amplitude response, phase response, memory effects, interference effects, distortion effects, compression effects, noise effects, and other effects, may each be observed systematically through the sounding process. The observed effects of the channel may be known as channel characterization 331.

A channel model update 332 may be performed to improve an approximation model of the channel effects. For example, the channel model update 332 may include a variation of a neural network that seeks to minimize a distance between the distributions exhibited by the channel and the distributions exhibited by the stochastic channel approximation network.

Further, encoder/decoder network updates 333 may be performed by using this channel approximation network 332 in order to optimize performance of the encoder/decoder networks for metrics, such as, minimized error rate, minimal power usage, or other objectives. Received baseline encoding 304 and learned encoding 305 sections may undergo processing for optional transforms 341. These optional transforms 341 can include, for example, mapping from orthogonal frequency division multiplexing (OFDM) subcarriers, subcarrier permutations, interleavings, wavelet basis de-mappings, or other structural organization features.

The received baseline encoding 304 then passes through a demodulation 342 function to produce an output, while the learned encoding 305 section passes through a decoder network 352 to produce an output. These two outputs, e.g., from the demodulation 342 and the decoder network 352, may include additional processing stages 343 such as forward error correct (FEC), randomization, encryption, to name a few examples.

The outputs may represent recovered known sequences 344 corresponding to transmitted sequences 242, or they may include recovered MAC Frames 347 corresponding to transmitted MAC frames 244. In the case of known sequences, a sequence comparison may be performed between 344 and 242. The known sequences 242 may be reproduced using the same process at the transmitted site, e.g., transmit modem, or transmitted through another method for comparison. This comparison may produce one or more sequence error rate estimates, such as a bit error rate (BER) or symbol error rate (SER), which may be used for bit error rate tracking 346 or other sequence error rate tracking to measure performance. In the case of MAC frames 347, error detection schemes, such as CRC calculation 348, may be used to compute a metric for frame errors. For example, the metric can include an error rate such as frame pass rate based on cyclic redundancy check (CRC), bit/symbol error rate, or other sequence error rate that may be used based on seed, pre-determined sequence values, or message values. The metric for frame errors may be used to produce one or more estimates for a frame error rate tracking 349 performance monitoring component. These MAC frames may include headers 356 that can include control information, routing information, error detection information, or other fields, as well as information packets 357 that carry data or payloads. These carry data or payloads can include Ethernet frames or IP packets, as well as other possible contents 358, such as, telemetry, other diagnostic information, or feedback to be carried over the link.

Figure 4:
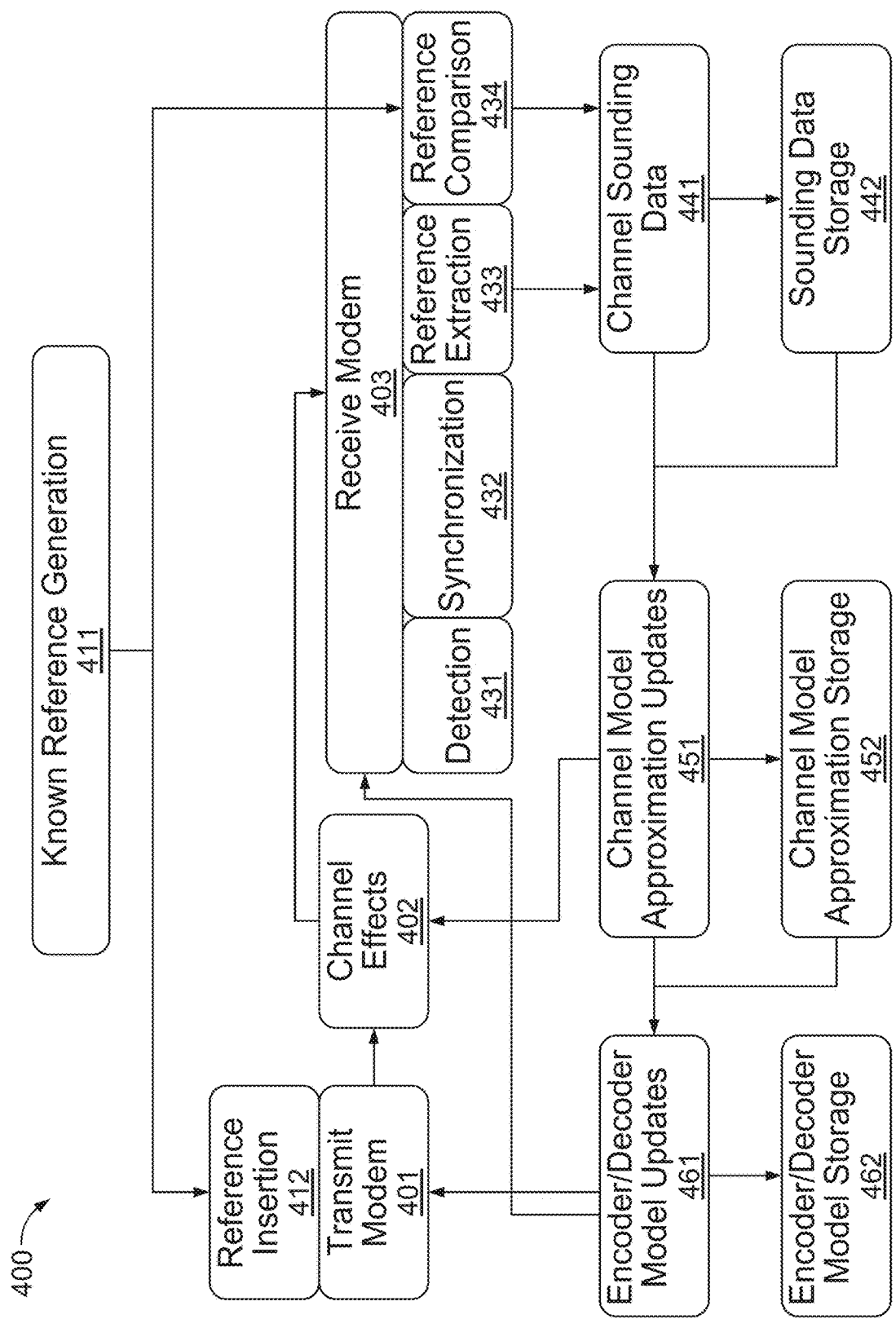
FIG. 4 is an example high-level view of a modem transmission system, channel effects, reception system, model training and update system, and model storage and feedback system.

FIG. 4 is an example high-level view 400 of the modem transmission system, channel effects, reception system, model training and update system, and model storage and feedback system. In 400, a transmit modem 401 transmits one or more information frames through a set of channel effects 402 to a receive modem 403. The transmit modem 401 may be implemented in software, hardware, firmware, DSP, or other system implementations. The transmit modem 401 can typically include a method to convert a digital signal to analog, such as a digital to analog radio, as well as possible tuning, filtering, and amplification stages. In some instances, the possible tuning, filtering, and amplification stages may be considered modeled within the channel effects.

In some instances, the channel effects include the cumulative set of effects from transmission hardware, propagation effects, interference effects, distortion effects, or other effects from the radio propagation channel, occurring to the transmitted signal or mixing with the transmitted signal through the transmission channel. Additionally, the channel effects may include the simulation of such effects using a channel approximation model. Similar to the transmit modem, the receive modem may also be implemented in software, hardware, firmware, DSP, or other system implementations. The receive modem includes hardware to convert an analog signal, such as a received radio signal, into a digital representation, such as an RF analog to digital converted signal. Additionally, the receive modem can include radio filtering, amplification and tuning hardware.

In some instances, the transmit and receive modems can perform known reference generation 411. The known reference generation 411 can be used for reference insertion 412 within the transmit modem for inserting known reference tones, and reference comparison 434 within the receive modem. Within the receive modem, a number of high level tasks can performed, such as detection of information frames 431, synchronization to the information frames 432, extraction of reference tones 433, and comparison to the known reference signals 434. In some instances, the combination of signals 433 and 434 can be used to produce the channel sounding data 441, which characterizes the channel effects realized in the system. The sounding data 441 may be stored directly 442, may be transmitted elsewhere for processing, or may be used directly in channel model approximation updates 451.

The channel model approximations 451 may be stored 452 for later use. For example, the channel model approximations 451 may be used to reproduce the conditions observed in the channel at one point in time, or may be directly used to train an encoder/decoder model update 461 to improve the learned encoding and decoding performance over the current channel effects. Additionally, the channel model approximations 451 may be used to simulate the performance of a system over some channel effects. These encoder/decoder models may be stored 462 or they may be loaded into the transmit and receive modems at any point to switch the method of learned encoding and decoding, which is actively used to transmit and receive information frame sections. Likewise, in the case of a simulated set of channel effects, channel models approximations may be loaded from updates or from storage into an active channel effects simulator 402 to change the current conditions or sets of phenomenon currently active in the communications channel.

Figure 5:
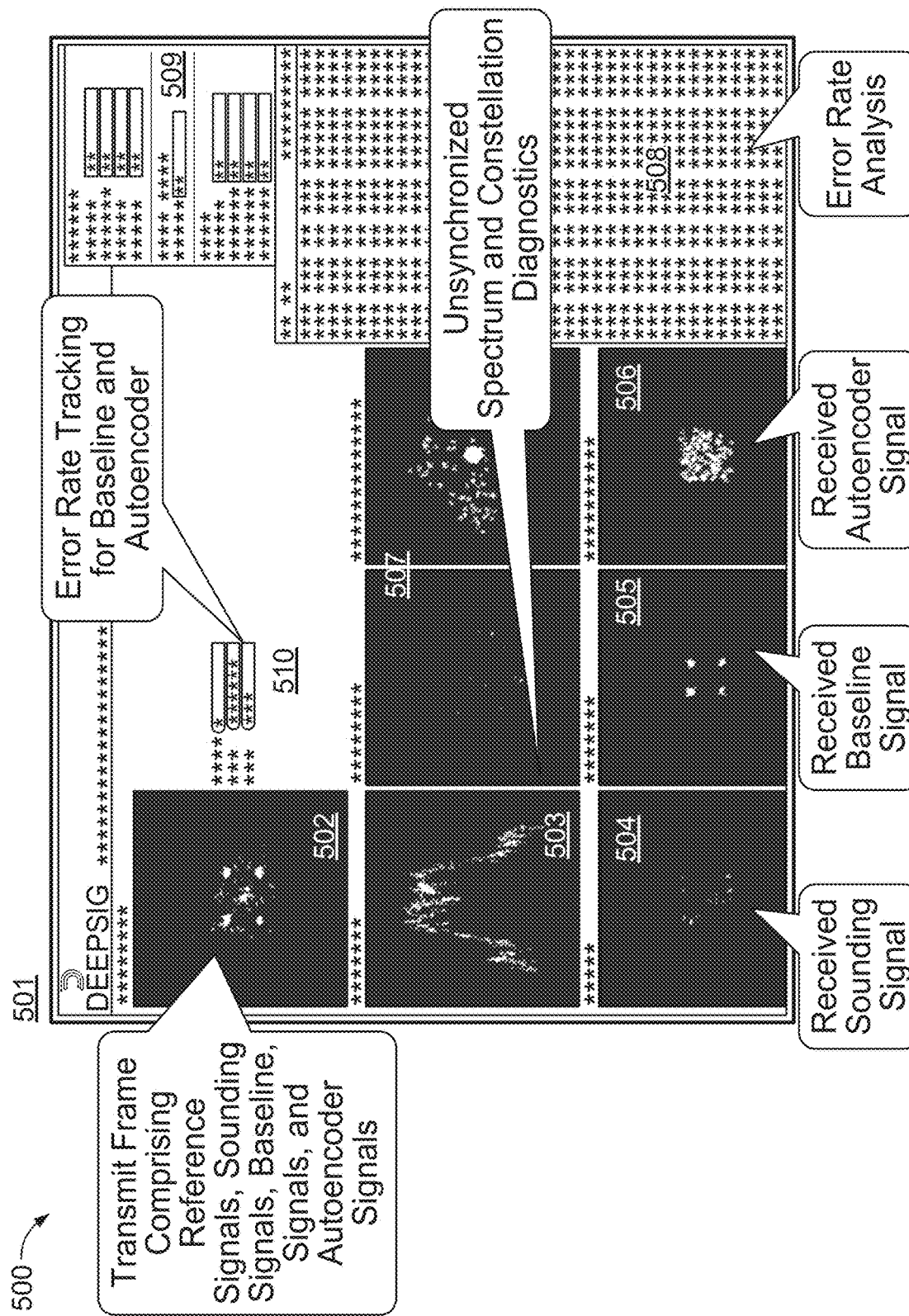
FIG. 5 is an example graphical interface for monitoring control and diagnostics between a transmit modem and one or more receive modems.

FIG. 5 is an example graphical interface for monitoring control and diagnostics of the system 500. In system 500, a graphical user interface 501 can be, for example, a web page that uses HTML and/or JAVASCRIPT to interface with a user or administrator. The web page can include one or more features that allow monitoring, configuring, diagnosing, performance monitoring, and comparing components of the communications system. Example components include a clean transmit signal constellation plot 502; a plot of the received power spectral density of a radio signal 503; one or more plots 507 of partially synchronized information at the receive modem. The plots 507 can include information after detection, timing synchronization, and frequency synchronization. Additionally, the components can include plots of the received sounding signal information 504; plots of the received baseline signal constellation 505; plots of the received learned encoding or auto-encoder signal 506; and, a detailed error rate and performance analysis logs 508. The components can also include controls 509 that allow the user to modify parameters of the communication system. These parameters can include operating frequency, bandwidth, gain settings, baseline modulation and coding modes, learned encoding and decoding modes, or parameters of a simulated channel effect model, e.g. signal to noise ratio, fading parameters, etc.

Finally, the graphical user interface 501 can include diagnostic information 510. The diagnostic information 510 can include error rate tracking, such as bit error rate, block error rate, code word error rate, or frame error rates for the baseline and/or learned encoding schemes. The diagnostic information 510 can include error and frame rates, such as rates that are compared between the two schemes for purposes of performance comparison. For example, error rates for different encoding schemes and traditional QAM, QPSK, QAM or other encoding schemes can easily by compared with such a metric to determine the most effective and performance scheme for certain channel conditions, operating factors, and particular information rates. In some instances, this diagnostic information 510 may be transmitted through a protocol or monitoring API. In other instances, this diagnostic information 510 may be displayed through various application implementations.

Figure 6:
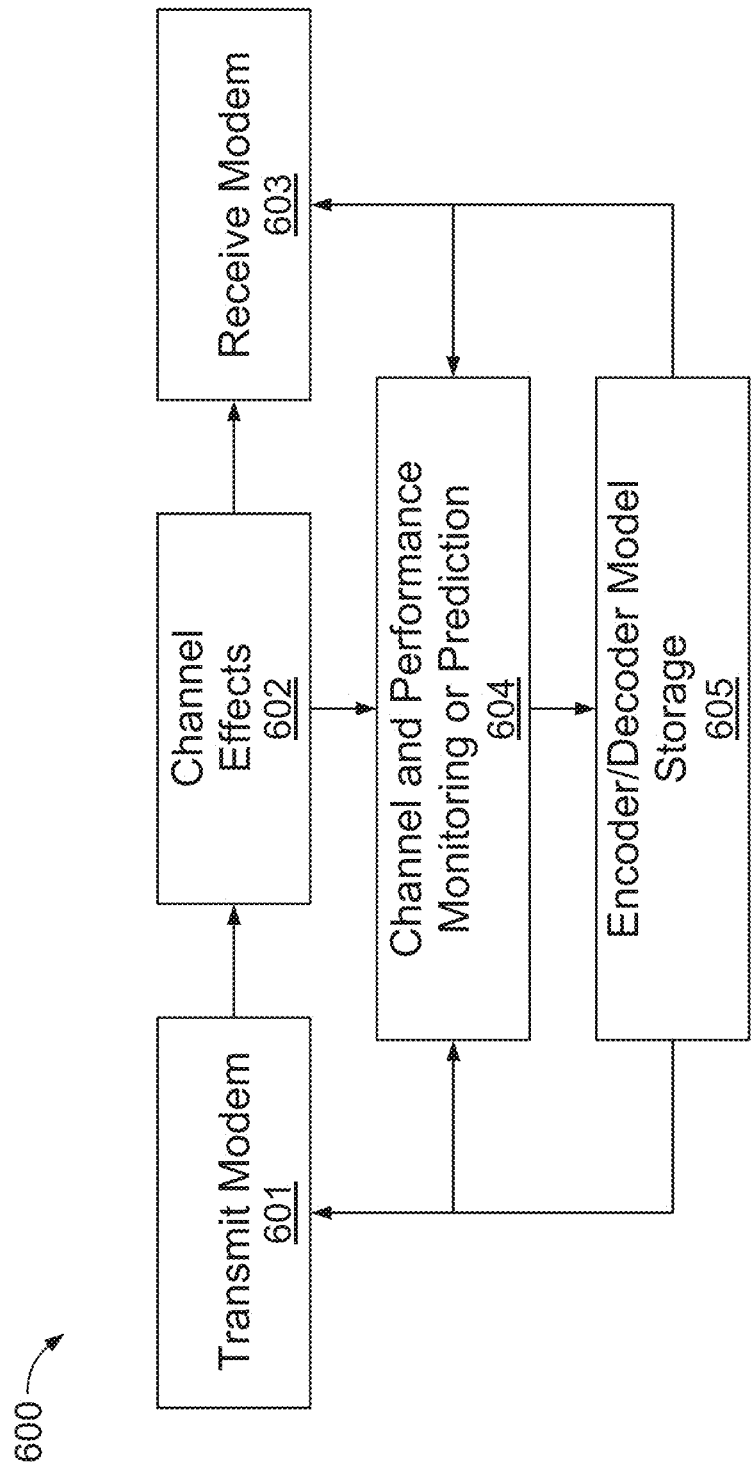
FIG. 6 is an example process for monitoring and updating communication system encoding modes based on channel effects or predicted channel effects.

FIG. 6 is an example process 600 for monitoring and updating communication system encoding modes based on channel effects or predicted channel effects. In some instances, the dynamic changes in channel conditions, or predictions of changes in channel conditions 604, which may be performed by algorithms or machine learning models may leverage information from the transmit modem 601, the channel effects or simulations 602, or the receive modem 603, in order to change the mode of the transmit and/or receive modem. For example, based on the changing channel conditions, the encoder/decoder model storage 605 may be used to load a new encoding mode at a different information rate, or trained under different impairment conditions into the transmit modem 601 and the receive modem 603. Similarly, the modes of the baseline modulation and demodulation functions within the transmit modem and the receive modem may be switched to change the information rate, the processing steps, or the parameters which are currently active in each modem. For example, changing from QSPK to FSK or changing from QAM to OFDM.

Figure 7:
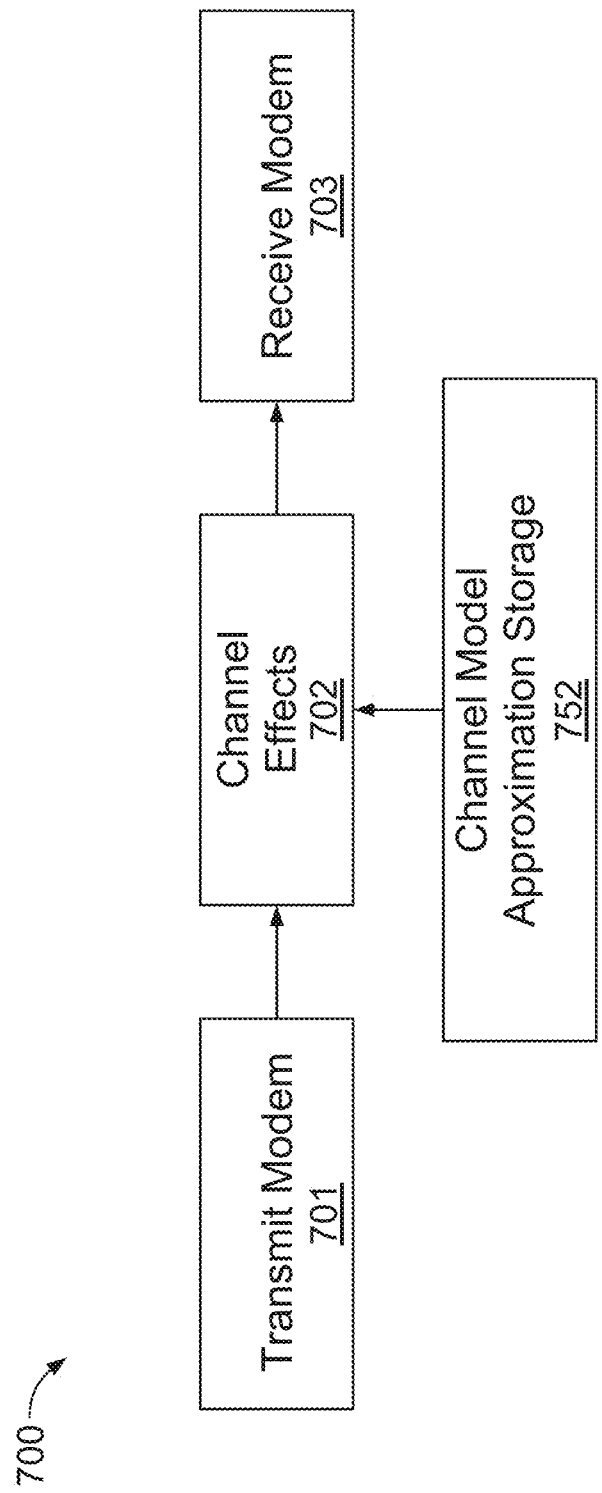
FIG. 7 is an example of a system for loading different channel model approximations from storage into a channel effects model.

FIG. 7 is an example of a system 700 for loading different channel model approximations from storage into a channel effects model. During testing, verification, or training of a communications system, the system 700 seeks to simulate conditions under a wide range of physical world conditions or communication system equipment configurations. Thus, in some instances, a transmit modem 701, a set of channel effects 702, and a receive modem 703 may be configured to load stored channel approximation models from storage 752 into a channel effects simulation. For example, specific conditions from various cellular deployments, mobile scenarios, or other spatial or radio scenarios may be loaded and reproduced within the stochastic models' accuracy. Such a system can be used to reproduce with a high degree of accuracy a set of baseline simulations desirable for communications system verification. The communications system verification can include simplified and simplistic physical models within the $3^{rd}$ Generation Partnership Project (3GPP) channel model specification for urban, rural, walking, high-speed train, vehicular, or other channel environment conditions.

Figure 8:
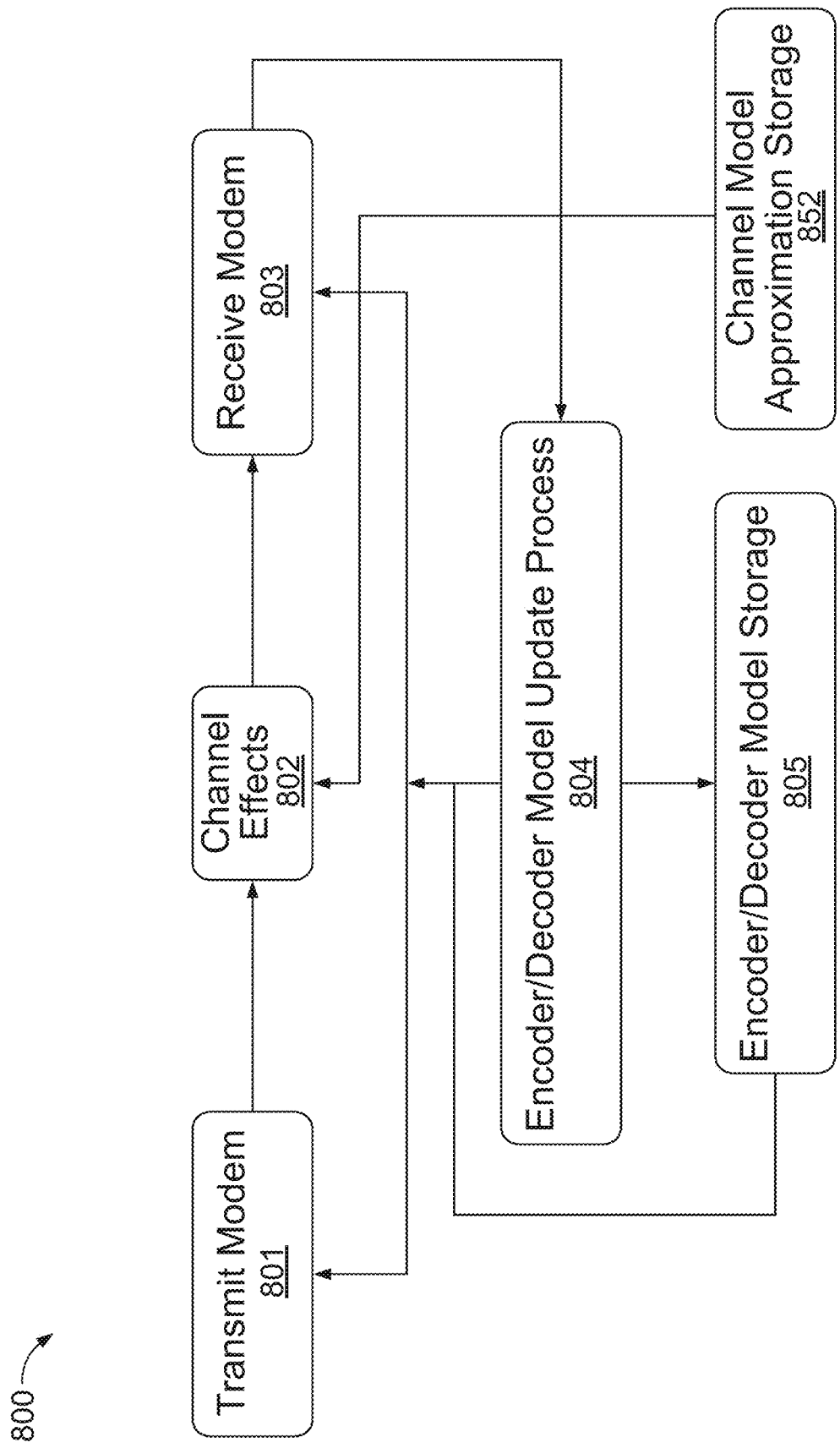
FIG. 8 is an example of a system for loading different channel model approximations into a channel effects model as well as loading from storage and updating encoder/decoder models based on the channel approximation model.

FIG. 8 is an example of a system 800 for loading different channel model approximations into a channel effects model as well as loading from storage and updating encoder/decoder models based on the channel approximation model. In system 800, various channel models may be loaded from the channel model approximation storage 852 into the channel effects model 802 in order to simulate a range of different communication system channel conditions. For example, sounding data captured under real world scenarios or deployments may match to different communication system channel conditions, or it may more generally reflect expected system conditions in the future. Using a transmit modem 801, the channel effects model 802, and a receive modem 803, an encoder/decoder update process 804 may be performed in order to optimize the encoding and decoding process for the specific channel model and/or conditions.

For instance, new modulation schemes, coding schemes, interleaving, sequence models, or other transforms may be learned and fit by this update process to improve performance on specific channel models for various high-level objective functions. These models may be stored in storage 805 and loaded back to the transmit modems and the receive modems depending on the prioritized objectives and current channel conditions.

Figure 9:
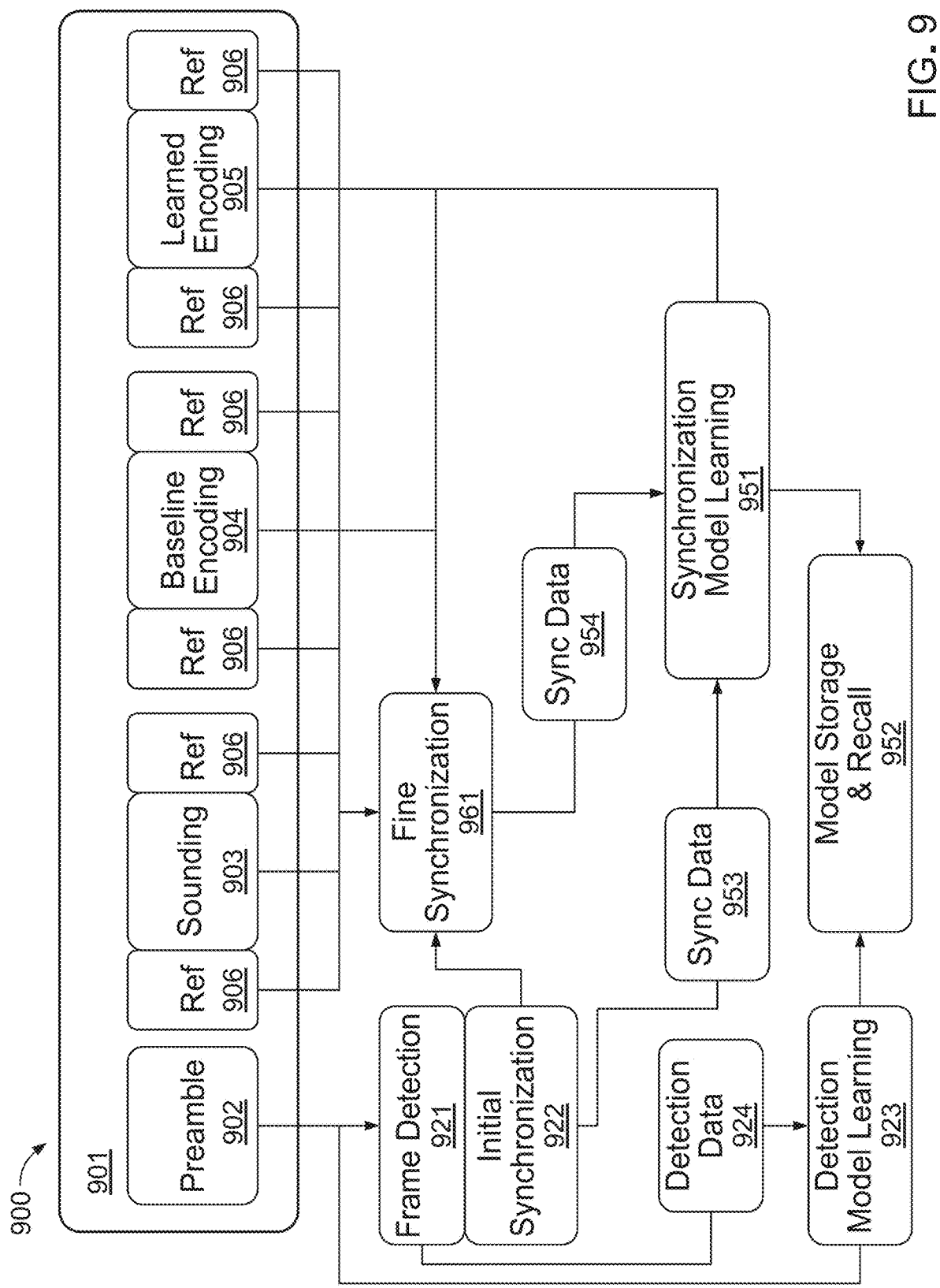
FIG. 9 is an example of a system for learning and deploying models for detection, and synchronization models as part of the receive modem infrastructure.

FIG. 9 is an example of a system 900 for learning and deploying models for detection and synchronization models as part of the receive modem infrastructure. In system 900, the received information frame 901 and its component sections, such as the preamble 902, can be used for frame detection 921. Detection algorithms, such as matched filters or ground truth from out-of-band, e.g., information from the transmitter about when things were transmitted, may produce detection data 924. The detection data 924 may include received samples as well as target annotations indicating when detections occurred, for example. The detection data 924 may be used for detection model learning 923, which can be used to learn detection algorithms. The detection model learning 923 may improve performance of detection under various channel effects or reduced computational complexity. The detection model learning 923 may include various models such as neural networks, convolutional neural networks, recurrent neural networks, reservoir-computing models, or other probabilistic models that may be trained on the detection data 924.

The various models may be stored and recalled from the model storage and recall capability 952 and can be switched out in 921 between learned and non-learned detection algorithms. In some instances, initial synchronization routines 922 which estimate time, frequency, spatial modes, and other parameters of the signal frame's arrival may produce sync data 953. Sync data 953 can include raw received samples, processed forms of the received samples, and annotations about time, frequency, spatial modes, and other parameters of arrival. Using the sync data 953, synchronization model learning 951 may be conducted in order to train learned approximation models to improve synchronization performance under various channel effects and reduce computational complexity of synchronization. For example, inference algorithms, such as these described, can drastically reduce power consumption and computational complexity by requiring fewer arithmetic operations, e.g., multiplications and additions, which allow for reduced precision arithmetic operations, e.g., 1 bit, 8 bit, 16 bit, 16 bit float, etc., vs. larger forms such as 32 bit float. Additionally, by exploiting parallelism in the algorithms, many core processing platforms can execute more efficiently.

To improve the performance of learned models, both detection data and sync data may be augmented by the introduction of variations in the data. For instance, variations in the data include different distortions, offsets, or other impairments that may be added to the data and to the target values in order to train the models 923,951 to be more resilient under a variety of impairments. A fine synchronization module 961 may use reference tones 906 or other portions of the received information frame (901), such as pilot tones, in order to produce estimates of channel state information such as time, frequency, phase, amplitude, or spatial modes of arrival. Some examples of producing estimates of channel state information also includes resolving unknown phase or equalization values, for instance, by interpolating across a sparse set of sounded known values. By interpolating, sync data can be produced as well as including sparse inputs of references along with known good target values for interpolation, e.g. from reference sequences, or from baseline synchronization or equalization routines.

Figure 10:
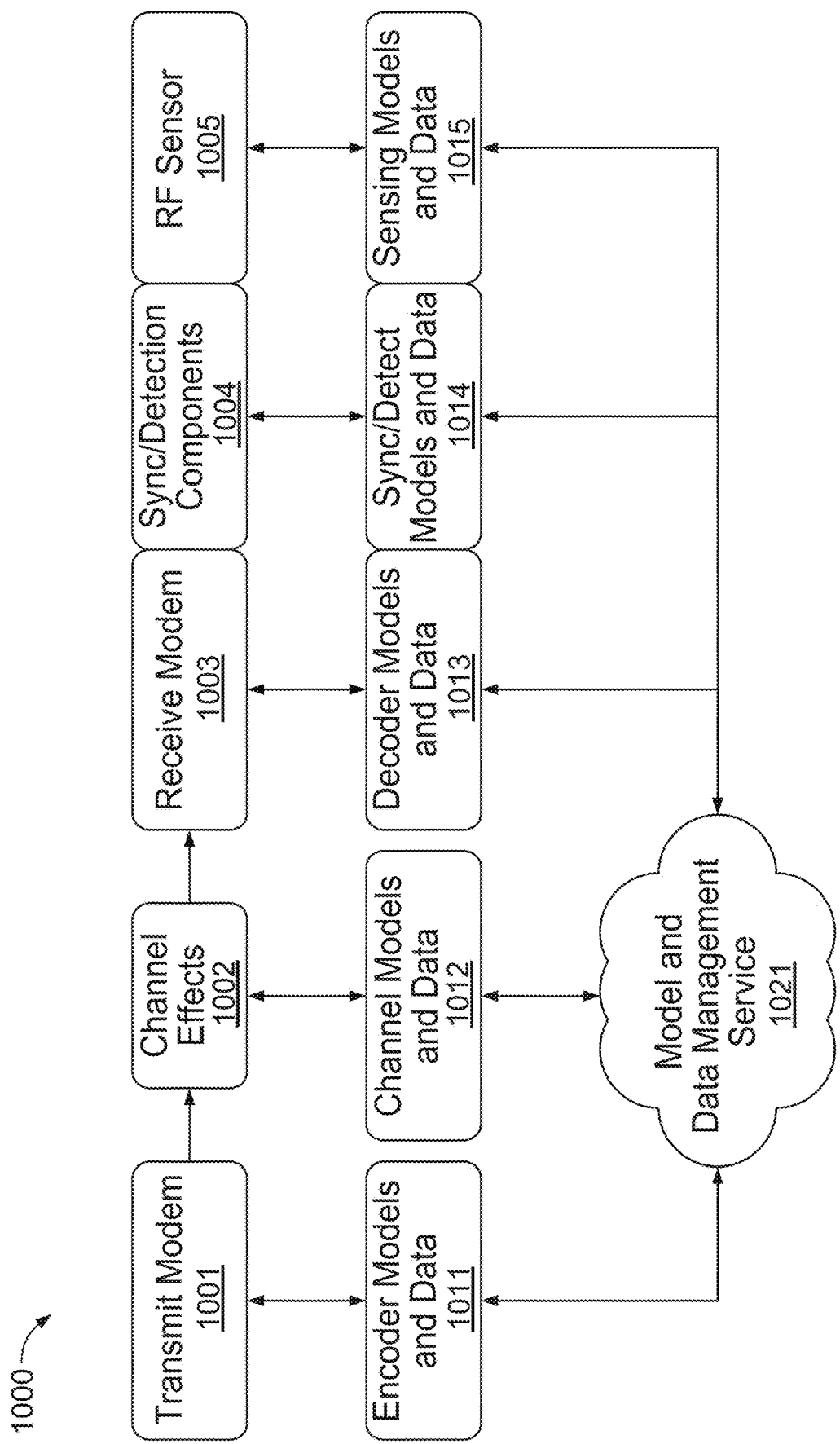
FIG. 10 is an example of a system for network management service for orchestration, remote services and cloud optimization of modem encoder/decoder models, channel approximation models, sync/detection models, and RF sensing models and data.

FIG. 10 is an example of a system 1000 for network management service for orchestration, remote services and cloud optimization of modem encoder/decoder models, channel approximation models, sync/detection models, and RF sensing models and data. In system 1000, transmit modems 1001 can send and receive encoder models with a remote model and data management service 1021, as well as provide encoder data examples. The model and data management service can provide remote training, warehousing of data, history and analytics of models and data, model validation, model quality assurance, and updated model management for deployment as a service to connected components.

Receive modems (using channel sounding and approximation components) and channel effects simulators 1002 can provide or receive channel models as well as channel sounding data with the management service 1021. Receive modems 1003 can exchange decode models and data from decoder processes with the management service 1021. Sync/detection learned models 1004 within the receive modems can also be exchanged with the model and data management service 1021 along with representative data and annotations from ground truth or from estimation routines. In particular, ground truth may include values from simulation, such as transmitted bits or symbols, states of the channel simulator, such as, frequency offset, time offset, and phase offset of the channel response. Additionally, ground truth may also include demodulated bits, which for instance have already include a correct checksum by having been processed by a conventional or machine learning receiver chain and are known with high probability to be correct for instance through the use of a 32 bit error checksum code, for example. RF Sensing components 1005, which may be located at a transmit modem or a receiver modem as well as at stand-alone RF Sensing nodes, may also exchange both raw sensing data and RF sensing models with the management service 1021.

Figure 11:
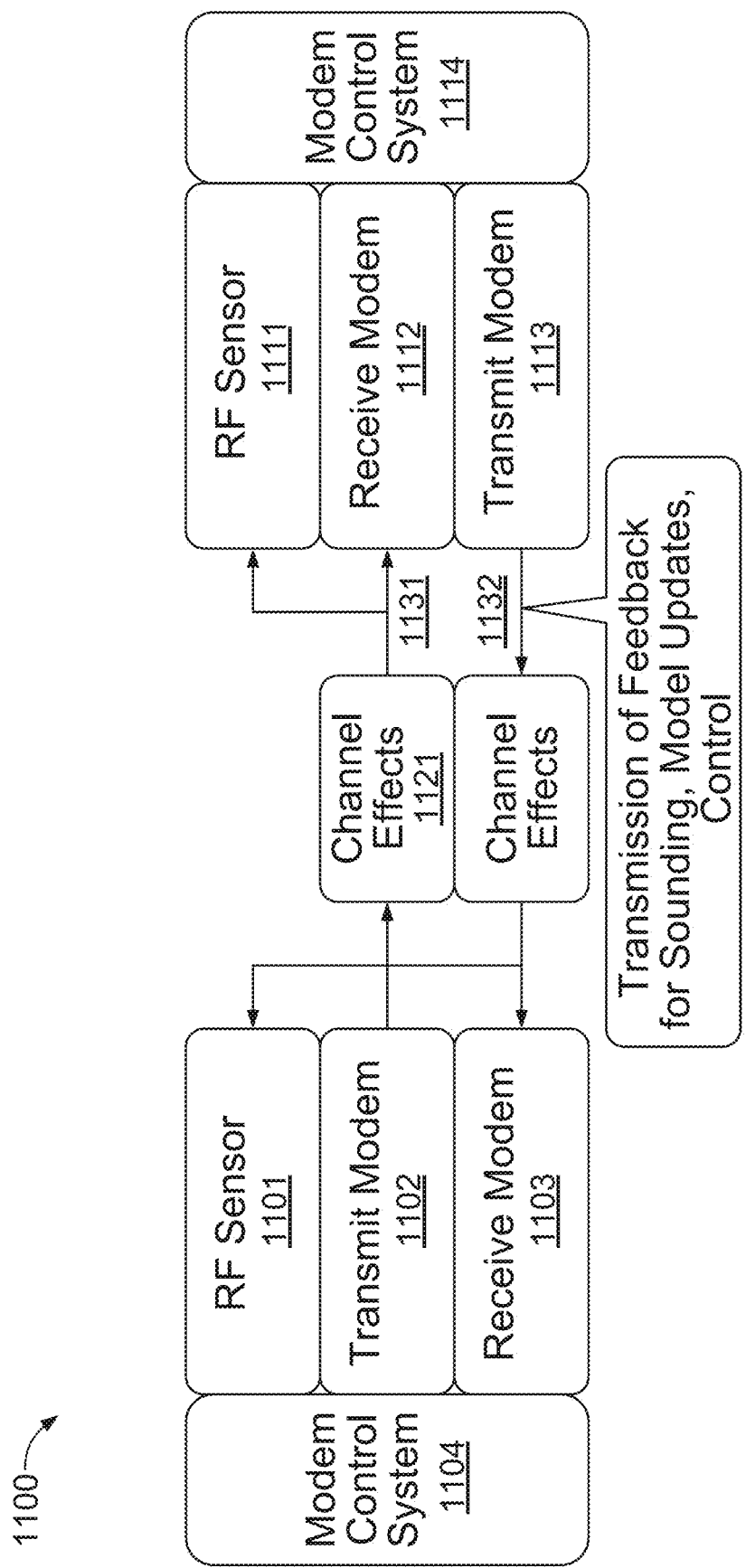
FIG. 11 is an example system of a bi-directional communication link between two nodes, where each node has transmit and receive capabilities as well as an RF sensing capability.

FIG. 11 is an example system 1100 of a bi-directional communication link between two nodes, where each node has transmit and receive capabilities, as well as an RF sensing capability. In system 1100, there is a forward communications link 1131 between the transmit modem 1102 and the receive modem 1112 through the first channel effects 1121. The system 1100 also includes a reverse communications link 1132 from the transmit modem 1113 to the receive modem 1103 through a second set of channel effects 1121, which may constitute a shared communications medium. Feedback data and model updates from each receive modem may be passed to the alternate transmit modem by the alternate path. For instance, updates and feedback to the forward link may be passed via the reverse link and vice versa.

RF Sensors 1101 and 1111 may detect spectrum occupancy, sources of interference, malicious behaviors in the channel, or other events, which may affect the communications system. A modem control system 1104 and 1114 on each transceiver may take sensing information into account as well and provide coordination between forward and reverse link performance metrics, operating modes, loaded modulation and coding schemes, encoding and decoding models, and sensing information.

Figure 12:
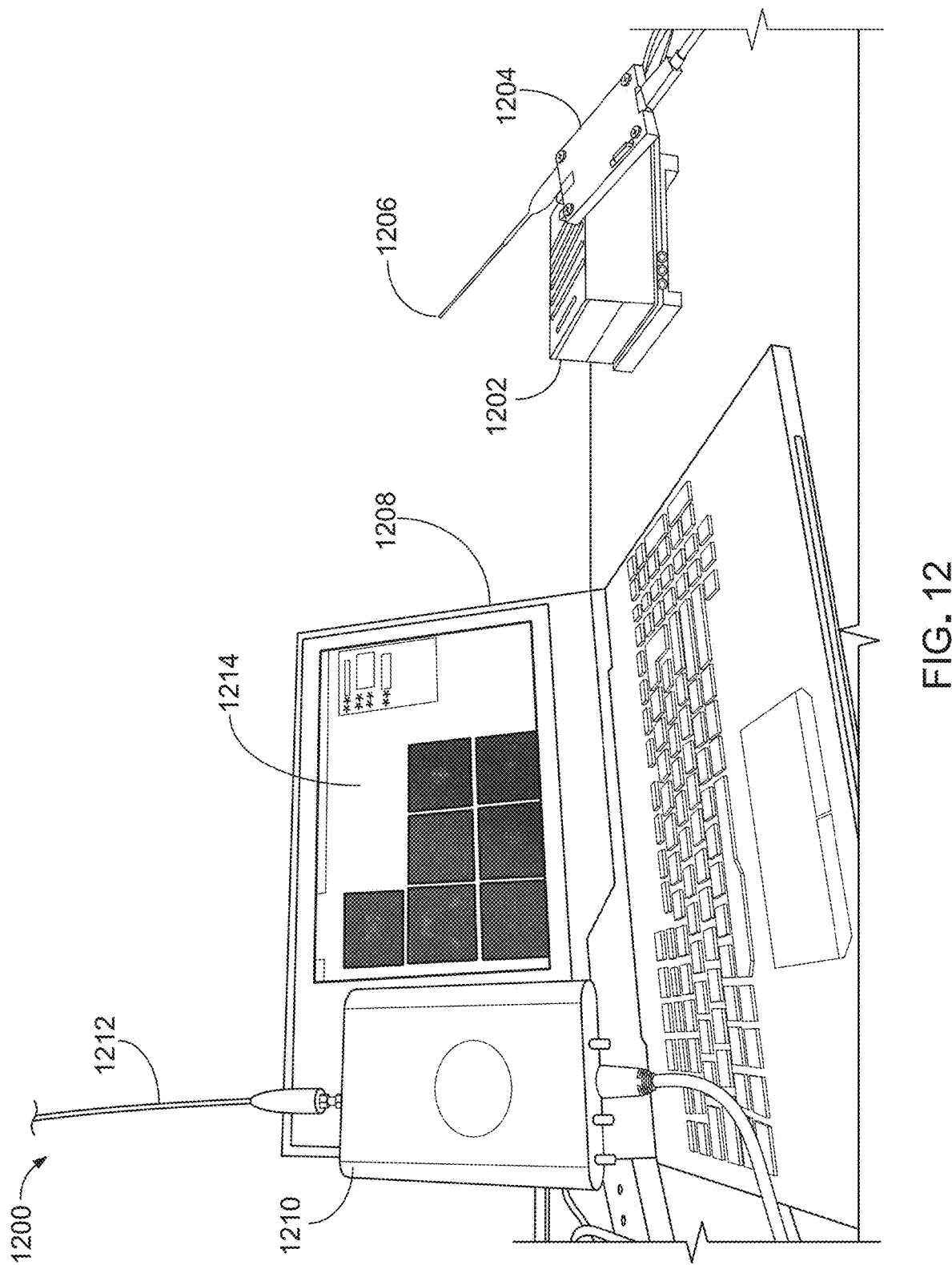
FIG. 12 is an example hardware system implementation of a deep learning communications system comprising a transmit modem, software radios, an over the air set of channel effects, a receive modem, and a diagnostic and monitoring graphical user interface.

FIG. 12 is an example hardware system implementation 1200 of a deep learning communications system comprising a transmit modem 1202, software radios 1204, an over the air set of channel effects between antennae 1206 and 1212, a receive modem 1210, and a diagnostic and monitoring graphical user interface (GUI) 1214 shown on laptop 1210. In system 1200, a transmit modem 1202 is embedded on a computing device along with a software radio 1204 transmitting information frames from an antenna 1206. Transmission occurs over the air to the laptop 1208 which hosts the receive modem, as well as a second software radio 1210 hardware device. The screen 1214 of the laptop 1208 illustrates constellation plots and diagnostics. The screen 1214 conveys information about the health and performance of the link and illustrates the performance of the baseline and learned encoding modes over the link.

The system 1200 is one exemplary system that implements the processes shown in FIGS. 1-11. In particular, the transmit modem 1202 transmits one or more information frames using a software radio 1204 through antenna 1206 over a radio propagation channel to the receive modem 1210. The receive modem 1210 receives the one or more information frames using the antenna 1212. The laptop 1208 may display data regarding the received one or more information frames on its GUI 1214. The GUI 1214 may display the one or more information frames received, the one or more information frames transmitted, and demodulated data. In particular, the GUI 1214 may display a clean transmit signal constellation plot, a plot of the received power spectral density of a radio signal, one or more plots of partially synchronized information at the receive modem. Additionally, the plots can include information after detection, timing synchronization, and frequency synchronization. The GUI 1214 can also include plots of the received sounding signal information, plots of the received baseline signal constellation, plots of the received learned encoding or auto-encoder signal, and, a detailed error rate and performance analysis logs.

The GUI 1214 can also allow the user to modify parameters associated with the communication system between the transmit modem 1202 and the receive modem 1210. In particular, these parameters that can be modified include operating frequency, bandwidth, gain settings, baseline modulation and coding modes, learned encoding and decoding modes, or parameters of a simulated channel effect model, e.g. signal to noise ratio, fading parameters, etc. Additionally, the GUI 1214 can include diagnostic information.

Figure 13:
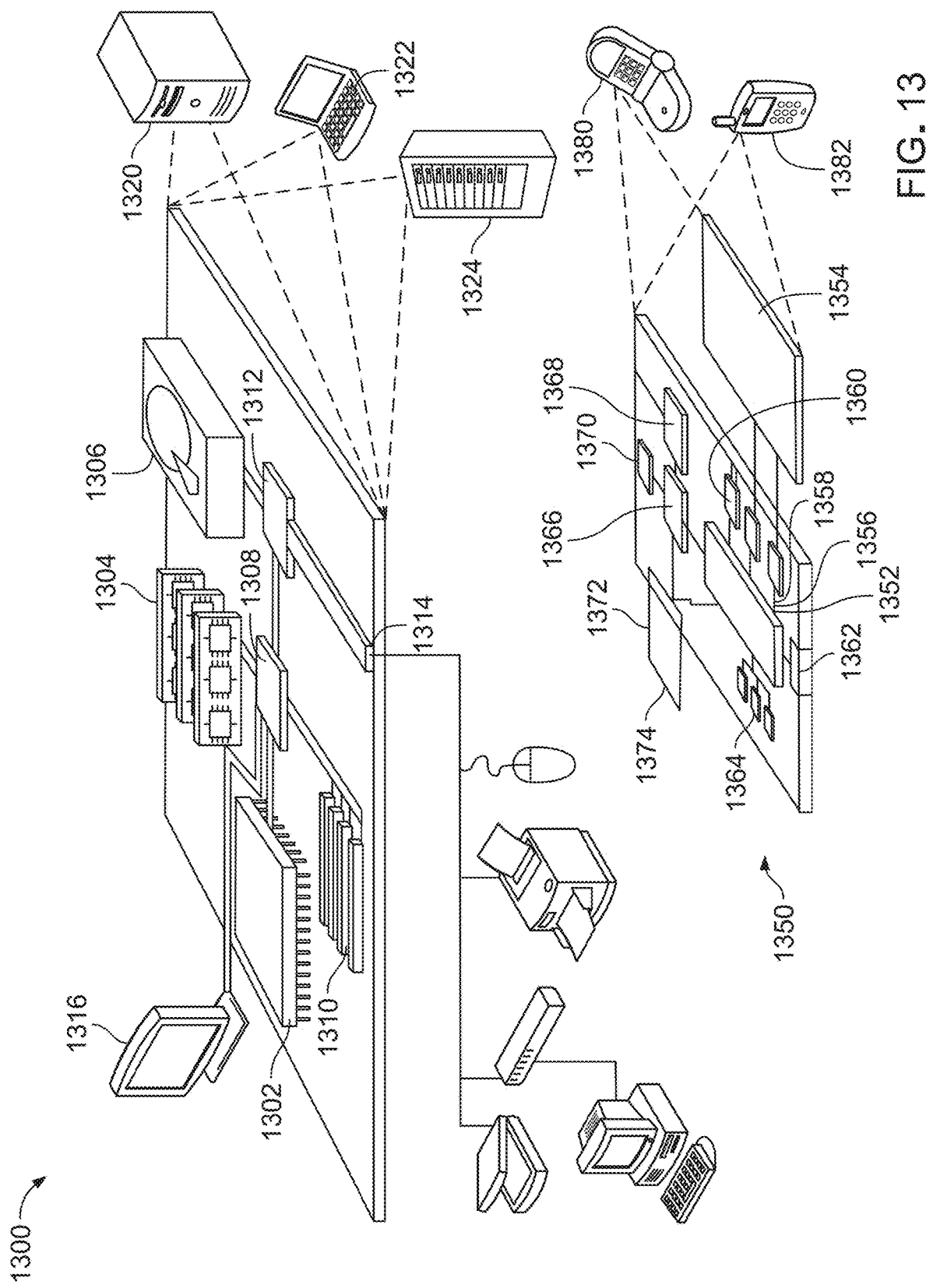
FIG. 13 is a diagram illustrating an example of a computing system used to implement one or more components of a system that performs monitoring and updating communication system encoding modes based on channel effects or predicted channel effects.

FIG. 13 is a diagram illustrating an example of a computing system used to implement one or more components of a system that performs monitoring and updating communication system encoding modes based on channel effects or predicted channel effects. The computing system includes a computing device 1300 and a mobile computing device 1350, at least one of which can be used to implement the techniques described herein. For example, in some implementations, the computing device 1300 is used to realize one or more parts of an encoder machine-learning network system or a decoder machine-learning network system, including, without limitation, implementing any of the machine-learning networks described above, accessing information from the machine-learning networks, or a server that accesses or stores information regarding the encoding and decoding performed by the machine-learning networks. The mobile computing device 1350 can also implement one or more parts of an encode machine-learning network system or a decoder machine-learning network system, as similarly described with respect to computing device 1300. In some examples, the mobile computing device 1350 may act as a transmit modem or a receive modem.

The computing device 1300 is intended to represent various forms of digital computers, such as laptops, desktops, workstations, personal digital assistants, servers, blade servers, mainframes, and other appropriate computers. The mobile computing device 1350 is intended to represent various forms of mobile devices, such as personal digital assistants, cellular telephones, smart-phones, mobile embedded radio systems, radio diagnostic computing devices, and other similar computing devices. The components shown here, their connections and relationships, and their functions, are meant to be examples only, and are not meant to be limiting.

The computing device 1300 includes a processor 1302, a memory 1304, a storage device 1306, a high-speed interface 1308 connecting to the memory 1304 and multiple high-speed expansion ports 1310, and a low-speed interface 1312 connecting to a low-speed expansion port 1314 and the storage device 1306. Each of the processor 1302, the memory 1304, the storage device 1306, the high-speed interface 1308, the high-speed expansion ports 1310, and the low-speed interface 1312, are interconnected using various busses, and may be mounted on a common motherboard or in other manners as appropriate. The processor 1302 can process instructions for execution within the computing device 1300, including instructions stored in the memory 1304 or on the storage device 1306 to display graphical information for a GUI on an external input/output device, such as a display 1316 coupled to the high-speed interface 1308. In other implementations, multiple processors and/or multiple buses may be used, as appropriate, along with multiple memories and types of memory. In addition, multiple computing devices may be connected, with each device providing portions of the operations (e.g., as a server bank, a group of blade servers, or a multi-processor system). In some implementations, the processor 1302 is a single-threaded processor. In some implementations, the processor 1302 is a multi-threaded processor. In some implementations, the processor 1302 is a quantum computer.

The memory 1304 stores information within the computing device 1300. In some implementations, the memory 1304 is a volatile memory unit or units. In some implementations, the memory 1304 is a non-volatile memory unit or units. The memory 1304 may also be another form of computer-readable medium, such as a magnetic or optical disk.

The storage device 1306 is capable of providing mass storage for the computing device 1300. In some implementations, the storage device 1306 may be or include a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 1302), perform one or more methods, such as those described above. The instructions can also be stored by one or more storage devices such as computer- or machine-readable mediums (for example, the memory 1304, the storage device 1306, or memory on the processor 1302). The high-speed interface 1308 manages bandwidth-intensive operations for the computing device 1300, while the low-speed interface 1312 manages lower bandwidth-intensive operations. Such allocation of functions is an example only. In some implementations, the high-speed interface 1308 is coupled to the memory 1304, the display 1316 (e.g., through a graphics processor or accelerator), and to the high-speed expansion ports 1310, which may accept various expansion cards (not shown). In the implementation, the low-speed interface 1312 is coupled to the storage device 1306 and the low-speed expansion port 1314. The low-speed expansion port 1314, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1300 may be implemented in a number of different forms, as shown in the figure. For example, it may be implemented as a standard server 1320, or multiple times in a group of such servers. In addition, it may be implemented in a personal computer such as a laptop computer 1322. It may also be implemented as part of a rack server system 1324. Alternatively, components from the computing device 1300 may be combined with other components in a mobile device (not shown), such as a mobile computing device 1350. Each of such devices may include one or more of the computing device 1300 and the mobile computing device 1350, and an entire system may be made up of multiple computing devices communicating with each other.

The mobile computing device 1350 includes a processor 1352, a memory 1364, an input/output device such as a display 1354, a communication interface 1366, and a transceiver 1368, among other components. The mobile computing device 1350 may also be provided with a storage device, such as a micro-drive or other device, to provide additional storage. Each of the processor 1352, the memory 1364, the display 1354, the communication interface 1366, and the transceiver 1368, are interconnected using various buses, and several of the components may be mounted on a common motherboard or in other manners as appropriate.

The processor 1352 can execute instructions within the mobile computing device 1050, including instructions stored in the memory 1364. The processor 1352 may be implemented as a chipset of chips that include separate and multiple analog and digital processors. The processor 1352 may provide, for example, for coordination of the other components of the mobile computing device 1350, such as control of user interfaces, applications run by the mobile computing device 1350, and wireless communication by the mobile computing device 1350.

The processor 1352 may communicate with a user through a control interface 1358 and a display interface 1356 coupled to the display 1354. The display 1354 may be, for example, a TFT (Thin-Film-Transistor Liquid Crystal Display) display or an OLED (Organic Light Emitting Diode) display, or other appropriate display technology. The display interface 1356 may include appropriate circuitry for driving the display 1354 to present graphical and other information to a user. The control interface 1358 may receive commands from a user and convert them for submission to the processor 1352. In addition, an external interface 1362 may provide communication with the processor 1352, so as to enable near area communication of the mobile computing device 1350 with other devices. The external interface 1362 may provide, for example, for wired communication in some implementations, or for wireless communication in other implementations, and multiple interfaces may also be used.

The memory 1364 stores information within the mobile computing device 1350. The memory 1364 can be implemented as one or more of a computer-readable medium or media, a volatile memory unit or units, or a non-volatile memory unit or units. An expansion memory 1374 may also be provided and connected to the mobile computing device 1350 through an expansion interface 1372, which may include, for example, a SIMM (Single In Line Memory Module) card interface. The expansion memory 1374 may provide extra storage space for the mobile computing device 1350, or may also store applications or other information for the mobile computing device 1350. Specifically, the expansion memory 1374 may include instructions to carry out or supplement the processes described above, and may include secure information also. Thus, for example, the expansion memory 1374 may be provide as a security module for the mobile computing device 1350, and may be programmed with instructions that permit secure use of the mobile computing device 1350. In addition, secure applications may be provided via the SIMM cards, along with additional information, such as placing identifying information on the SIMM card in a non-hackable manner.

The memory may include, for example, flash memory amid/or NVRAM memory (non-volatile random access memory), as discussed below. In some implementations, instructions are stored in an information carrier such that the instructions, when executed by one or more processing devices (for example, processor 1352), perform one or more methods, such as those described above. The instructions can also be stored by one or more storage devices, such as one or more computer- or machine-readable mediums (for example, the memory 1364, the expansion memory 1374, or memory on the processor 1352). In some implementations, the instructions can be received in a propagated signal, for example, over the transceiver 1368 or the external interface 1362.

The mobile computing device 1350 may communicate wirelessly through the communication interface 1366, which may include digital signal processing circuitry where necessary. The communication interface 1366 may provide for communications under various modes or protocols, such as GSM (Global System for Mobile communications) voice calls, SMS (Short Message Service), EMS (Enhanced Messaging Service), or MMS messaging (Multimedia Messaging Service), CDMA (Code Division Multiple Access), TDMA (Time Division Multiple Access), PDC (Personal Digital Cellular), WCDMA (Wideband Code Division Multiple Access), CDMA2000, GPRS (General Packet Radio Service), 4G LTE ($4^{th}$ Generation Long Term Evolution), 5G/6G ($5^{th}$ Generation/$6^{th}$ Generation) cellular, among others. Such communication may occur, for example, through the transceiver 1368 using a radio frequency. In addition, short-range communication may occur, such as using a Bluetooth, Wi-Fi, or other such transceiver (not shown). In addition, a GPS (Global Positioning System) receiver module 1370 may provide additional navigation- and location-related wireless data to the mobile computing device 1350, which may be used as appropriate by applications running on the mobile computing device 1350.

The mobile computing device 1350 may also communicate audibly using an audio codec 1060, which may receive spoken information from a user and convert it to usable digital information. The audio codec 1360 may likewise generate audible sound for a user, such as through a speaker, e.g., in a handset of the mobile computing device 1350. Such sound may include sound from voice telephone calls, may include recorded sound (e.g., voice messages, music files, etc.) and may also include sound generated by applications operating on the mobile computing device 1350.

The mobile computing device 1350 may be implemented in a number of different forms, as shown in the figure. For example, it may be implemented as a cellular telephone 1380. It may also be implemented as part of a smart-phone 1382, personal digital assistant, or other similar mobile device.

The term "system" as used in this disclosure may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. Sometimes a server is a general-purpose computer, and sometimes it is a custom-tailored special purpose electronic device, and sometimes it is a combination of these things.

Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

While this disclosure contains many specific implementation details, these should not be construed as limitations on the scope of any invention or of what may be claimed, but rather as descriptions of features that may be specific to particular implementations of particular inventions. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A computer-implemented method, comprising:
receiving, at a first modem, a first unit of communication over a radio frequency (RF) communication path from a second modem, wherein the first modem and the second modem process information for RF communications;
identifying, by the first modem, one or more fields in the first unit of communication, the one or more fields used to analyze the RF communication path;
extracting, by the first modem, data from the one or more fields;
accessing, by the first modem, a channel model that includes one or more machine learning models, wherein the channel model is configured to reproduce channel conditions in an approximation of a channel representative of the RF communication path from the first modem to the second modem;
training, by the first modem, the channel model using the extracted data, wherein the training includes:
providing, by the first modem, the extracted data to the channel model,
processing, using the channel model, the extracted data, and
in response to processing the extracted data, updating one or more parameters of the channel model, wherein the updated parameters of the channel model cause updates to the approximation of the channel representative of the communication path; and
in response to training the channel model, (i) generating, by the first modem, a simulated set of channel approximations associated with the communication path using the trained channel model, and (ii) providing the simulated set of channel approximations generated by the trained channel model for training, by one or more modems, one or more encoder/decoder models using the simulated set of channel approximations.

2. The computer-implemented method of claim 1, wherein the one or more fields of the first unit of communication comprise at least one of (i) a preamble frame, (ii), one or more reference signals, (iii) a sounding frame, (iv) a baseline encoding frame, or (v) a learned encoding frame.

3. The computer-implemented method of claim 2, further comprising:
   determining, by the first modem, a presence of an information frame by detecting a presence of the preamble frame in the first unit of communication; and
   detecting, by the first modem, one or more of:
      a time offset corresponding to an arrival time of the first unit of communication, wherein the time offset is caused by the set of channel approximations associated with the communication path,
      a frequency offset corresponding to the arrival time of the first unit of communication, wherein the frequency offset is caused by the set of channel approximations associated with the communication path, or
      a spatial offset unit of communication to the arrival time of the first unit of communication, wherein the spatial offset is caused by the set of channel approximations associated with the communication path.

4. The computer-implemented method of claim 3, further comprising:
   providing, by the first modem, one or more of the time offset, the frequency offset, phase offset, channel response, or the spatial offset to the channel model for approximating the channel representative of the communication path.

5. The computer-implemented method of claim 3, further comprising:
   determining, by the first modem, channel approximations of the channel representative of the communication path by comparing data within the sounding frame of the received first unit of communication to known data transmitted in the sounding frame by the second modem; and
   providing, by the first modem, the set of channel approximations to the channel model for updating the approximations of the channel representative of the communication path.

6. The computer-implemented method of claim 5, wherein the set of channel approximations includes one or more of amplitude response effects, phase response effects, memory effects, interference effects, distortion effects, compression effects, or noise effects, and
   wherein one or more of these effects included in the set of channel approximations is applied to the channel model to train the channel model.

7. The computer-implemented method of claim 5, wherein training the channel model further comprises:
   providing, by the first modem, the extracted data from the one or more fields to the channel model for training the channel model to minimize a computational distance between characteristics exhibited by the channel model upon applying the set of channel approximations to the channel model and characteristics of a reference channel used for comparison to the channel model.

8. The computer-implemented method of claim 2, wherein the first modem is coupled to an electronic device having a display, wherein the electronic device is configured to display the first unit of communication, including one or more of:
   displaying a transmit signal constellation plot of the first unit of communication;
   displaying a received power spectral density of the first unit of communication;
   displaying partially synchronized information of the first unit of communication determined by the first modem;
   displaying data corresponding to the sounding frame;
   displaying data corresponding to the learned encoding frame; or
   displaying data corresponding to an error rate of the received first unit of communication at the first modem.

9. The computer-implemented method of claim 1, further comprising:
   generating, by the first modem, the one or more encoder/decoder models used to model a use of encoding and decoding data between the first modem and the second modem, wherein the one or more encoder/decoder models is configured to generate an encoding mode at a particular information rate for the second modem based on the simulated set of channel approximations.

10. The computer-implemented method of claim 1, wherein generating the simulated set of channel approximation associated with the communication path further comprises:
    in response to training the channel model, generating, by the first modem, the simulated set of channel approximations associated with the communication path from a prior point in time.

11. A system comprising:
    one or more computers and one or more storage devices storing instructions that are operable, when executed by the one or more computers, to cause the one or more computers to perform operations comprising:
       receiving, at a first modem, a first unit of communication over a radio frequency (RF) communication path from a second modem, wherein the first modem and the second modem process information for RF communications;
       identifying, by the first modem, one or more fields in the first unit of communication, the one or more fields used to analyze the RF communication path;
       extracting, by the first modem, data from the one or more fields;
       accessing, by the first modem, a channel model that includes one or more machine learning models, wherein the channel model is configured to reproduce channel conditions in an approximation of a channel representative of the RF communication path from the first modem to the second modem;
       training, by the first modem, the channel model using the extracted data, wherein the training includes:
          providing, by the first modem, the extracted data to the channel model,
          processing, using the channel model, the extracted data, and
          in response to processing the extracted data, updating one or more parameters of the channel model, wherein the updated parameters of the channel model cause updates to the approximation of the channel representative of the communication path; and
       in response to training the channel model, (i) generating, by the first modem, a simulated set of channel approximations associated with the communication path using the trained channel model, and (ii) providing the simulated set of channel approximations generated by the trained channel model for training, by one or more modems, one or more encoder/decoder models using the simulated set of channel approximations.

12. The system of claim 11, wherein the one or more fields of the first unit of communication comprise at least one of (i) a preamble frame, (ii), one or more reference signals, (iii) a sounding frame, (iv) a baseline encoding frame, or (v) a learned encoding frame.

13. The system of claim 12, further comprising:
determining, by the first modem, a presence of an information frame by detecting a presence of the preamble frame in the first unit of communication; and
detecting, by the first modem, one or more of:
a time offset corresponding to an arrival time of the first unit of communication, wherein the time offset is caused by the set of channel approximations associated with the communication path,
a frequency offset corresponding to the arrival time of the first unit of communication, wherein the frequency offset is caused by the set of channel approximations associated with the communication path, or
a spatial offset unit of communication to the arrival time of the first unit of communication, wherein the spatial offset is caused by the set of channel approximations associated with the communication path.

14. The system of claim 13, further comprising:
providing, by the first modem, one or more of the time offset, the frequency offset, phase offset, channel response, or the spatial offset to the channel model for approximating the channel representative of the communication path.

15. The system of claim 13, further comprising:
determining, by the first modem, channel approximations of the channel representative of the communication path by comparing data within the sounding frame of the received first unit of communication to known data transmitted in the sounding frame by the second modem; and
providing, by the first modem, the set of channel approximations to the channel model for updating the approximations of the channel representative of the communication path.

16. The system of claim 15, wherein the set of channel approximations includes one or more of amplitude response effects, phase response effects, memory effects, interference effects, distortion effects, compression effects, or noise effects, and
wherein one or more of these effects included in the set of channel approximations is applied to the channel model to train the channel model.

17. The system of claim 15, wherein training the channel model further comprises:
providing, by the first modem, the extracted data from the one or more fields to the channel model for training the channel model to minimize a computational distance between characteristics exhibited by the channel model upon applying the set of channel approximations to the channel model and characteristics of a reference channel used for comparison to the channel model.

18. The system of claim 12, wherein the first modem is coupled to an electronic device having a display, wherein the electronic device is configured to display the first unit of communication, including one or more of:
displaying a transmit signal constellation plot of the first unit of communication;
displaying a received power spectral density of the first unit of communication;
displaying partially synchronized information of the first unit of communication determined by the first modem;
displaying data corresponding to the sounding frame;
displaying data corresponding to the learned encoding frame; or
displaying data corresponding to an error rate of the received first unit of communication at the first modem.

19. The system of claim 11, further comprising:
generating, by the first modem, the one or more encoder/decoder models used to model a use of encoding and decoding data between the first modem and the second modem, wherein the one or more encoder/decoder models is configured to generate an encoding mode at a particular information rate for the second modem based on the simulated set of channel approximations.

20. A non-transitory computer-readable medium storing software comprising instructions executable by one or more computers which, upon such execution, cause the one or more computers to perform operations comprising:
receiving, at a first modem, a first unit of communication over a radio frequency (RF) communication path from a second modem, wherein the first modem and the second modem process information for RF communications;
identifying, by the first modem, one or more fields in the first unit of communication, the one or more fields used to analyze the RF communication path;
extracting, by the first modem, data from the one or more fields;
accessing, by the first modem, a channel model that includes one or more machine learning models, wherein the channel model is configured to reproduce channel conditions in an approximation of a channel representative of the RF communication path from the first modem to the second modem;
training, by the first modem, the channel model using the extracted data, wherein the training includes:
providing, by the first modem, the extracted data to the channel model,
processing, using the channel model, the extracted data, and
in response to processing the extracted data, updating one or more parameters of the channel model, wherein the updated parameters of the channel model cause updates to the approximation of the channel representative of the communication path; and
in response to training the channel model, (i) generating, by the first modem, a simulated set of channel approximations associated with the communication path using the trained channel model, and (ii) providing the simulated set of channel approximations generated by the trained channel model for training, by one or more modems, one or more encoder/decoder models using the simulated set of channel approximations.

21. The computer-readable medium of claim 20, wherein the one or more fields of the first unit of communication comprise at least one of (i) a preamble frame, (ii), one or more reference signals, (iii) a sounding frame, (iv) a baseline encoding frame, or (v) a learned encoding frame.

* * * * *